Patented Sept. 6, 1932

1,876,007

UNITED STATES PATENT OFFICE

RICHARD HUPE, OF KONSTANZ, GERMANY, ASSIGNOR, BY MESNE ASSIGNMENTS, TO DEUTSCHE GOLD- & SILBER-SCHEIDEANSTALT VORMALS ROESSLER, OF FRANKFORT-ON-THE-MAIN, GERMANY, A CORPORATION OF GERMANY

PROCESS FOR THE HYDROGENATION OF NAPHTHALENE

No Drawing. Application filed October 6, 1931, Serial No. 567,314, and in Germany October 7, 1930.

This invention relates to the production of benzol and hydrocarbons of the benzol series by the treatment of naphthalene with hydrogen in the presence of a catalyst.

It has already been proposed in United States Patent No. 1,733,908 of Schrauth to hydrogenate purified naphthalene by treatment with hydrogen at moderately raised pressures, for example, 10 atmospheres and moderately raised temperatures, for example, 150 to 200° C.

According to another known process described in British Patent No. 147,474 of Schroeter, purified naphthalene is hydrogenated with the theoretical amount of hydrogen at moderately raised temperatures, for example 120 to 150° C. by means of catalysts such as nickel. It is stated in this patent that the pressure is of small importance; the reaction only proceeds somewhat more quickly at 50 to 100 atmospheres than at 3 to 10 atmospheres.

It has already been proposed in British Patent No. 283,600 to hydrogenate cyclic compounds including naphthalene at temperatures by heating above 300° C. in the presence of mixed catalysts which, for example, might contain iron, cobalt, nickel, by means of hydrogen at reduced pressure, at the usual pressure or slightly raised pressure. In this case it is expressly recommended to free the cyclic compounds to be hydrogenated and the gases or gaseous mixtures serving as hydrogenation gases from contact poisons such as sulphur. In the examples given in this patent which refer to hydrogenation of naphthalene, that is Examples 4 and 5, the treatment is carried out at the normal pressure. In one case the temperature amounted to 350° C., in other cases to 400 to 450° C.

These known processes of hydrogenating naphthalene are based on the idea that sulphur compounds constitute contact poisons and must be removed as far as possible before hydrogenation. Subsequent working on these known processes has shown that they give rise only to a very small amount of conversion of naphthalene and the yields of products of hydrogenation of high value are relatively small.

The present invention, on the other hand, effects the hydrogenation of naphthalene with very high speed of reaction and produces large yields of benzol or of hydrocarbons of the benzol series. The new process consists in carrying out the hydrogenation of naphthalene in the presence of excess of hydrogen, while employing pressures of more than 50 atmospheres, for example pressures such as 100 to 500 atmospheres and more, at temperatures which lie above the point at which a sudden fall in temperature occurs, and by employing catalysts which contain iron, cobalt or nickel, while care is taken that such amounts of hydrogen sulphide are present that the action of the catalysts containing the metal is improved.

In order to explain the sudden fall of temperature the following may be stated:—

If naphthalene is subjected to heating under pressure with excess of hydrogen in the presence of the catalysts in question then upon reaching a certain temperature a definite fall in temperature takes place which corresponds to an absorption of heat by the napthalene of at least 3,000 to 4,000 calories per gram-molecule and which is caused by the endothermic splitting of the naphthalene ring to be hydrogenated.

The critical temperature point lies in general within relatively narrow limits, for example between 450 and 500° C., but these limits are dependent upon the operating conditions selected, for example, upon the particular catalyst employed, the partial pressure of the hydrogen and so forth.

According to the invention, the procedure is that after heating the reaction mixture up to the critical temperature point, further heating is so carried out that the reaction material is maintained at temperatures which lie above the critical temperature point. In general, it has proved to be of advantage to work so that the process is carried out at temperatures which lie at least 20° C. above the critical point. If the critical temperature point for example lies at 480° C. then by working at temperatures of for example, 500 to 510° C., a product is obtained which besides benzol contains considerable amounts of homologues such as toluol and xylol.

The increase in temperature above this point, on the one hand, acts to accelerate the reaction, and, on the other hand, to produce increased formation of benzol. When working at temperatures of 540° C. and more, reaction products are obtained which substantially consist only of benzol. The highest permissible temperature limits can in each case be determined by preliminary tests. Too long heating is to be avoided since, as a result, further splitting up of the benzol hydrocarbons may arise.

High partial pressures of hydrogen, for example 95 to 97% of the total pressure, promote the formation of benzol. Lower partial pressures of hydrogen, for example, 75 to 80% of the total pressure, promote the formations of homologues such as toluol and xylol.

The catalysts employed may be compounds of metals of the iron sub-group of the eighth group of the periodic system of classification, that is to say, iron, nickel and cobalt and oxygen compounds, that is to say, oxides of the said metals may be used with advantage. Further, sulphur compounds that is to say, sulphides of the said metals, may be employed, for example, as also the metals themselves. It is to be recommended to determine the best suited catalyst from case to case by preliminary tests. In many cases, it has proved to be advantageous to employ mixtures of the said catalysts with one another or with other materials, for example metals or metal compounds.

The use of such catalysts for hydrogenation processes and in particular, for processes of destructive hydrogenation is in itself known. As has been found, however, the iron, nickel and cobalt catalysts to be employed according to the present invention, take up a special position among the thousands of known hydrogenation catalysts insofar as they are capable of yielding combinations of catalysts with hydrogen sulphide which yield better results than the iron, nickel or cobalt catalysts alone. This fact is surprising to a high degree since sulphur compounds are generally regarded as catalyst poisons and a number of proposals have been made recommending the removal of sulphur compounds before the hydrogenation itself. Thus, for example, in British Patent No. 329,688, it is proposed to free the circulated gases so thoroughly from hydrogen sulphide that the hydrogenation gas no longer contains more than 0.3% of hydrogen sulphide. The object in that case is so to reduce the content of hydrogen sulphide by special means that the remaining small amounts can no longer produce the combination effects which are produced according to the present invention. Similarly, for example, in French Patent No. 620,632, it is proposed to treat starting material containing sulphur in such a way that the sulphur is converted into hydrogen sulphide before the hydrogenation by a special process and the hydrogen sulphide is removed.

In the hydrogenation of naphthalene the presence of sulphur compounds has been particularly avoided. Thus, for example, the above-mentioned United States Patent No. 1,733,908 and British Patent No. 147,474 refer to the treatment of purified naphthalene. In British Patent No. 283,600, it is also recommended to free both the cyclic compounds to be hydrogenated as well as the gases or gaseous mixtures from contact poisons "such as sulphur". In the same patent mixtures of hydrogen with nitrogen, carbon dioxide and the like are recommended as hydrogenation gases, while the same patentees in other processes such as the destructive hydrogenation of coal tar, oils and the like, have mentioned hydrogenation gases containing hydrogen sulphide as permissible. According to this as far as is hitherto known, when so-called catalysts immune to poisoning are used it is to be expected in the most favourable cases that sulphur compounds would not have an injurious action or at least not a too injurious action. In no case, however, was it foreseen that, in the hydrogenation of naphthalene in which previously the presence of sulphur compounds was considered particularly injurious, certain catalysts, actually iron, nickel and cobalt catalysts could be improved considerably in their activity by the presence of definite amounts of hydrogen sulphide.

In addition primary products of hydrogenation of naphthalene such as tetrahydronaphthalene and decahydronaphthalene can also be employed as starting materials in certain cases. This may be effected by bringing such materials arising from previous processes again into the process in order to convert them together with freshly introduced naphthalene into benzol hydrocarbons. The process may be carried out discontinuously or continuously with a flowing stream of gas. In the latter case, care should be taken that the relative amounts of naphthalene hydrogen and hydrogen sulphide during the reaction as well as the velocity of flow of the mixture of gas and vapour should remain constant throughout the reaction space and that the content of hydrogen sulphide during the course of the reaction shall be maintained within the limits which promote the reaction, that is to say, in general within the limits of 1 to 15% of hydrogen sulphide calculated on the weight of the naphthalene present.

A special advantage of the process consists in the fact that the direct treatment of crude naphthalene containing sulphur may be effected so that the purification of this starting material which was usual previously can be omitted. The content of sulphur in the crude naphthalene is in this case taken into account in such a way that the necessary amounts of hydrogen sulphide are present for producing the optimum effects of the combination.

*Examples*

Experiments without the addition of sulphur:—

1. 300 gms. of naphthalene are heated in a rotating autoclave for an hour at 520° C. with an initial pressure of hydrogen of 110 atmospheres. 15 gms. of cobalt hydroxide are employed as the catalyst. A product is obtained which does not boil below 150° C. but an amount boils below 180° C. which corresponds to a yield of benzol hydrocarbons of 15%.

2. 300 gms. of naphthalene are treated as in Experiment 1. 15 gms. of iron hydroxide are used as the catalyst. A product is obtained no part of which boils up to 150° C. but an amount boils below 180° which corresponds to a yield of 12% of benzol hydrocarbons.

The two examples set forth show that without the addition of sulphur, hydrogenation scarcely takes place at all. The following experiments are to prove that by means of the experience forming the basis of the invention far better results can be produced than by the use of metals or metal compounds alone.

Experiments with the addition of sulphur:—

3. 300 gms. of naphthalene are heated for an hour in a rotating autoclave at 540° C. with an initial pressure of hydrogen of 110 atmospheres. 15 gms. (5%) of nickel hydroxide plus 10.7 gms. of sulphur (3% excess over the amount equivalent to the nickel) are employed as the catalyst. The critical temperature point lies at about 490° C. 220 c. c. of oil is obtained of specific gravity 0.925 with 65% products boiling below 180° which corresponds to a yield of benzol hydrocarbons of 45%.

4. 300 gms. of naphthalene are heated in a rotating autoclave under the same conditions as in Experiment 1 with 15 gms. of cobalt hydroxide and 10.7 gms. of sulphur (3% excess over the amount equivalent to the cobalt) used as the catalyst. The critical temperature point lies at about 495° C. 275 c. c. of oil of a specific gravity of 0.929 is obtained of which 64% boils below 180° which corresponds to a yield of benzol hydrocarbons of 46.5%.

5. 300 gms. of naphthalene are heated under the same conditions as in Experiment 1 with 15 gms. of iron hydroxide and 10.7 gms. of sulphur (3% excess over the amount equivalent to the iron) used as the catalyst. The critical temperature point lies at about 485° C. 210 c. c. of oil of specific gravity 0.916 is obtained with 72% constituents boiling below 180°. The yield in benzol hydrocarbons is 46%.

6. 300 gms. of naphthalene are heated in a rotating autoclave for an hour with an initial pressure of hydrogen of 110 atmospheres at 520° C. The catalyst employed is 15 gms. of iron hydroxide plus the amount of sulphur which is equivalent to an excess of 4% over the amount equivalent to the iron. A yield of 50% of benzol hydrocarbons was obtained.

I claim:—

1. A process for the hydrogenation of naphthalene which consists in heating the naphthalene until a definite fall in temperature takes place in the presence of an excess of hydrogen and a catalyst containing a metal selected from the group consisting of iron, nickel and cobalt and an amount of hydrogen sulphide such as to increase the activity of said metal-containing catalyst, maintaining the pressure in the reaction space at a value above 50 atmospheres, and then further heating the reaction mixture at a temperature above the point of fall in temperature.

2. A process for the hydrogenation of naphthalene which consists in heating the naphthalene until a definite fall in temperature takes place in the presence of an excess of hydrogen and a catalyst containing an oxygen compound of a metal of the iron group and an amount of hydrogen sulphide such as to increase the activity of said metal-containing catalyst, maintaining the pressure in the reaction space at a value above 50 atmospheres, and then further heating the reaction mixture at a temperature above the point of fall in temperature.

3. A process for the hydrogenation of naphthalene which consists in heating the naphthalene in the presence of an excess of hydrogen and a catalyst containing a metal selected from the group consisting of iron, nickel and cobalt until a definite fall in temperature takes place, maintaining the pressure in the reaction space at a value above 50 atmospheres and then further heating the reaction mixture at a temperature above the point of fall in temperature.

4. A process for the hydrogenation of naphthalene which consists in heating the naphthalene in the presence of an excess of hydrogen and a catalyst containing a metal selected from the group consisting of iron, nickel and cobalt until a definite fall in temperature takes place, maintaining an amount of hydrogen sulphide within the reaction space between the limits of 1 to 15% of the weight of the naphthalene, adjusting the amount of hydrogen sulphide between said limits to such an amount as to increase the activity of said catalyst, maintaining the pressure in the reaction space at a value above 50 atmospheres and then further heating the reaction mixture at a temperature above the point of fall in temperature.

5. A process for the hydrogenation of naphthalene which consists in heating the naphthalene until a definite fall in temperature takes place in the presence of an excess of hydrogen and a catalyst containing a metal selected from the group consisting of iron, nickel and cobalt and an amount of hydrogen sulphide such as to increase the activity of said metal-containing catalyst, maintaining the pressure in the reaction space at a value above 50 atmospheres, and then heating the reaction mixture at a temperature more than 20 degrees above the point of fall in temperature.

6. A process for the hydrogenation of naphthalene which consists in heating the naphthalene until a definite fall in temperature takes place in the presence of an excess of hydrogen and a catalyst containing a metal selected from the group consisting of iron, nickel and cobalt and an amount of hydrogen sulphide such as to increase the activity of said metal-containing catalyst, maintaining the pressure in the reaction space at a value above 50 atmospheres, and then heating the reaction mixture at a temperature more than 50° above the point of fall in temperature in order to accelerate the reaction and increase the formation of benzol.

7. A process for the hydrogenation of naphthalene which consists in heating the naphthalene until a definite fall in temperature takes place, in the presence of an excess of hydrogen and a catalyst containing a metal selected from the group consisting of iron, nickel and cobalt and an amount of hydrogen sulphide such as to increase the activity of said metal-containing catalyst, maintaining the pressure in the reaction space at a value above 50 atmospheres, and then further heating the reaction mixture at a temperature above the point of fall in temperature, the partial pressure of hydrogen in the reaction space being at least 75 per cent of the total pressure.

8. A process for the hydrogenation of naphthalene which consists in heating the naphthalene until a definite fall in temperature takes place in the presence of an excess of hydrogen and a catalyst containing a metal selected from the group consisting of iron, nickel and cobalt and an amount of hydrogen sulphide such as to increase the activity of said metal-containing catalyst, maintaining the pressure in the reaction space at a value above 50 atmospheres, and then further heating the reaction mixture at a temperature above the point of fall in temperature, the partial pressure of hydrogen in the reaction space being more than 95 per cent of the total pressure.

9. A process for the hydrogenation of naphthalene which consists in heating the naphhalene until a definite fall in temperature takes place in the presence of an excess of hydrogen and a catalyst containing a metal selected from the group consisting of iron, nickel and cobalt and an amount of hydrogen sulphide such as to increase the activity of said metal-containing catalyst, maintaining the pressure in the reaction space at a value above 50 atmospheres, and then heating said reaction mixture at a temperature above 500 degrees centigrade.

10. A process for the hydrogenation of naphthalene which consists in heating the naphthalene until a definite fall in temperature takes place in the presence of an excess of hydrogen and a catalyst containing a metal selected from the group consisting of iron, nickel and cobalt and an amount of hydrogen sulphide such as to increase the activity of said metal-containing catalyst, maintaining the pressure in the reaction space at a value above 50 atmospheres and then heating the reaction mixture at a temperature above 540 degrees centigrade.

11. A process for the hydrogenation of naphthalene which consists in heating the naphthalene in the presence of an excess of hydrogen and of a catalyst containing a metal of the iron group and a sufficient amount of hydrogen sulphide in order to increase the activity of said metal-containing catalyst, maintaining the pressure in the reaction space at a value above 50 atmospheres, the heating being carried on until a definite fall in temperature occurs, further heating the reaction mixture at a temperature above that at which the fall in temperature occurs, continually supplying further naphthalene and hydrogen in excess and maintaining such an amount of hydrogen sulphide in the reaction space as to increase the activity of said metal-containing catalyst.

In witness whereof I hereunto subscribe my name this 24 day of September, 1931.

DR. RICHARD HUPE.